(12) United States Patent
Cheung et al.

(10) Patent No.: US 8,752,380 B2
(45) Date of Patent: Jun. 17, 2014

(54) COLLAPSIBLE SOLAR-THERMAL CONCENTRATOR FOR RENEWABLE, SUSTAINABLE EXPEDITIONARY POWER GENERATOR SYSTEM

(75) Inventors: Patrick C. Cheung, Castro Valley, CA (US); Alexander S. Tuganov, Redwood City, CA (US); Sean Garner, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 125 days.

(21) Appl. No.: 13/478,039

(22) Filed: May 22, 2012

(65) Prior Publication Data
US 2013/0312412 A1 Nov. 28, 2013

(51) Int. Cl.
*F03G 6/06* (2006.01)

(52) U.S. Cl.
USPC .......... 60/641.15; 60/520; 126/571; 126/576; 126/600; 126/605; 126/696

(58) Field of Classification Search
USPC .................... 60/641.8–641.15; 126/569–713; 136/206, 214, 243–251
See application file for complete search history.

(56) References Cited

U.S. PATENT DOCUMENTS

| | | |
|---|---|---|
| 3,923,381 A | 12/1975 | Winston |
| 3,988,166 A | 10/1976 | Beam |
| 4,021,267 A | 5/1977 | Dettling |
| 4,045,246 A | 8/1977 | Mlavsky et al. |
| 4,053,327 A | 10/1977 | Meulenberg, Jr. |
| 4,084,985 A | 4/1978 | Evans, Jr. |
| 4,086,485 A | 4/1978 | Kaplow et al. |
| 4,095,997 A | 6/1978 | Griffiths |
| 4,114,596 A | 9/1978 | Chang et al. |
| 4,131,485 A | 12/1978 | Meinel et al. |

(Continued)

FOREIGN PATENT DOCUMENTS

| | | |
|---|---|---|
| CN | 2606309 Y | 3/2004 |
| CN | 1854637 A | 11/2006 |

(Continued)

OTHER PUBLICATIONS

Mulligan et al. "A Flat-Plate Concentrator: Micro-Concentrator Design Overview", 2000 IEEE, pp. 1495-1497.
Terao et al. "A Miro-Less Design for Mico-Concentrator Modules", Conference Record of the 28th IEEE Photovoltaic Specialists Conference (2000) pp. 1416-1419.
Mulligan et al. "Development of Chip-Size Silicon Solar Cells", IEEE Photovoltaic Specialists Conference, 2000, pp. 158-163.

(Continued)

*Primary Examiner* — Thomas Denion
*Assistant Examiner* — Xiaoting Hu
(74) *Attorney, Agent, or Firm* — Bever, Hoffman & Harms, LLP; Patrick T. Bever

(57) ABSTRACT

A solar-thermal concentrator for a expeditionary power generator system including a portable power plant that utilizes a hybridized solar/fuel Stirling engine to supply electric power in an expeditionary setting. The concentrator includes a collapsible dish assembly that is pivotably and tiltably mounted on a portable base assembly, where the dish assembly includes a lightweight frame including a central mounting structure and multiple truss-like radial arms that are rigidly connected to and extend radially from the central mounting structure, and a reflector panel assembly including multiple flat, fan-shaped reflector panels that are secured to the frame and disposed in a semi-circular pattern. Each reflector panel includes multiple reflectors that collectively form a substantially flat Fresnelized reflective surface that redirects incident sunlight into a focal region. The power plant is maintained in the focal region by a support structure that extends perpendicular to the flat reflective surface.

13 Claims, 14 Drawing Sheets

(56) References Cited

U.S. PATENT DOCUMENTS

| | | | |
|---|---|---|---|
| 4,148,301 A | 4/1979 | Cluff | |
| 4,177,083 A | 12/1979 | Kennedy | |
| 4,221,468 A | 9/1980 | Macken | |
| 4,224,081 A | 9/1980 | Kawamura et al. | |
| 4,234,351 A | 11/1980 | Deminet et al. | |
| 4,296,731 A | 10/1981 | Cluff | |
| 4,320,251 A | 3/1982 | Narasimhan et al. | |
| 4,331,703 A | 5/1982 | Lindmayer | |
| 4,337,758 A | 7/1982 | Meinel et al. | |
| 4,440,153 A | 4/1984 | Melchior | |
| 4,683,348 A | 7/1987 | Pidgeon et al. | |
| 4,711,972 A | 12/1987 | O'Neill | |
| 4,746,370 A | 5/1988 | Woolf | |
| 4,771,764 A | 9/1988 | Cluff | |
| 4,792,685 A | 12/1988 | Yamakawa | |
| 4,841,946 A | 6/1989 | Marks | |
| 4,847,349 A | 7/1989 | Ohta et al. | |
| 4,849,028 A | 7/1989 | Krause | |
| 4,855,884 A | 8/1989 | Richardson | |
| 4,947,825 A | 8/1990 | Moriarty | |
| 4,952,026 A | 8/1990 | Bellman et al. | |
| 5,004,319 A | 4/1991 | Smither | |
| 5,062,899 A | 11/1991 | Kruer | |
| 5,089,055 A | 2/1992 | Nakamura | |
| 5,167,724 A | 12/1992 | Chiang | |
| 5,172,170 A | 12/1992 | Hays et al. | |
| 5,180,441 A | 1/1993 | Cornwall et al. | |
| 5,216,543 A | 6/1993 | Calhoun | |
| 5,344,496 A | 9/1994 | Stern et al. | |
| 5,389,159 A | 2/1995 | Kataoka et al. | |
| 5,404,869 A | 4/1995 | Parkyn, Jr. et al. | |
| 5,501,743 A | 3/1996 | Cherney | |
| 5,529,054 A | 6/1996 | Shoen | |
| 5,540,216 A | 7/1996 | Rasmusson | |
| 5,552,820 A | 9/1996 | Genovese | |
| 5,559,677 A | 9/1996 | Errichiello | |
| 6,011,307 A | 1/2000 | Jiang et al. | |
| 6,020,554 A | 2/2000 | Kaminar et al. | |
| 6,067,982 A * | 5/2000 | Harrison | 126/571 |
| 6,091,017 A | 7/2000 | Stern | |
| 6,094,273 A | 7/2000 | Asher et al. | |
| 6,097,530 A | 8/2000 | Asher et al. | |
| 6,118,067 A | 9/2000 | Lashley et al. | |
| 6,130,465 A | 10/2000 | Cole | |
| 6,131,565 A | 10/2000 | Mills | |
| 6,140,570 A | 10/2000 | Kariya | |
| 6,165,389 A | 12/2000 | Asher et al. | |
| 6,239,353 B1 * | 5/2001 | Hall et al. | 136/246 |
| 6,274,508 B1 | 8/2001 | Jacobsen et al. | |
| 6,278,054 B1 | 8/2001 | Ho et al. | |
| 6,379,521 B1 | 4/2002 | Nishio | |
| 6,407,329 B1 | 6/2002 | Iino et al. | |
| 6,410,644 B2 | 6/2002 | Mumick et al. | |
| 6,420,266 B1 | 7/2002 | Smith et al. | |
| 6,451,429 B2 | 9/2002 | Mumick et al. | |
| 6,479,395 B1 | 11/2002 | Smith et al. | |
| 6,527,964 B1 | 3/2003 | Smith et al. | |
| 6,531,653 B1 | 3/2003 | Glenn et al. | |
| 6,568,863 B2 | 5/2003 | Murata | |
| 6,590,235 B2 | 7/2003 | Carey et al. | |
| 6,597,510 B2 | 7/2003 | Bunkenburg et al. | |
| 6,623,579 B1 | 9/2003 | Smith et al. | |
| 6,896,381 B2 | 5/2005 | Benitez et al. | |
| 6,958,868 B1 | 10/2005 | Pender | |
| 7,045,794 B1 | 5/2006 | Spallas et al. | |
| 7,152,985 B2 | 12/2006 | Benitez et al. | |
| 7,160,522 B2 | 1/2007 | Minano Dominguez et al. | |
| 7,181,378 B2 | 2/2007 | Benitez et al. | |
| 7,638,708 B2 | 12/2009 | Fork et al. | |
| 2002/0056473 A1 | 5/2002 | Chandra et al. | |
| 2002/0148497 A1 | 10/2002 | Sasaoka et al. | |
| 2002/0149107 A1 | 10/2002 | Chang et al. | |
| 2003/0016539 A1 | 1/2003 | Minano et al. | |
| 2003/0051750 A1 | 3/2003 | Lawheed | |
| 2003/0232174 A1 | 12/2003 | Chang et al. | |
| 2004/0031517 A1 | 2/2004 | Bareis | |
| 2004/0070855 A1 | 4/2004 | Benitez et al. | |
| 2004/0084077 A1 | 5/2004 | Aylaian | |
| 2004/0151014 A1 | 8/2004 | Speakman | |
| 2004/0191422 A1 | 9/2004 | Kataoka | |
| 2004/0211460 A1 | 10/2004 | Simburger et al. | |
| 2005/0029236 A1 | 2/2005 | Gambino et al. | |
| 2005/0034751 A1 | 2/2005 | Gross et al. | |
| 2005/0046977 A1 | 3/2005 | Shifman | |
| 2005/0081908 A1 | 4/2005 | Stewart | |
| 2006/0207650 A1 | 9/2006 | Winston et al. | |
| 2006/0231133 A1 | 10/2006 | Fork et al. | |
| 2007/0137690 A1 | 6/2007 | Bruning et al. | |
| 2007/0137691 A1 | 6/2007 | Cobb et al. | |
| 2008/0047605 A1 | 2/2008 | Benitez et al. | |
| 2008/0186593 A1 | 8/2008 | Chan et al. | |
| 2008/0308154 A1 | 12/2008 | Cart et al. | |
| 2009/0056789 A1 | 3/2009 | Draganov | |
| 2009/0084374 A1 | 4/2009 | Mills et al. | |
| 2010/0024861 A1 * | 2/2010 | Cabanillas Saldana | 136/244 |
| 2010/0043434 A1 * | 2/2010 | Ortiz et al. | 60/641.15 |
| 2011/0031211 A1 | 2/2011 | Chan et al. | |
| 2011/0226332 A1 | 9/2011 | Ford et al. | |
| 2011/0235025 A1 * | 9/2011 | Blumenthal et al. | 356/138 |

FOREIGN PATENT DOCUMENTS

| | | |
|---|---|---|
| CN | 101227158 A | 7/2008 |
| DE | 3104690 A1 | 8/1982 |
| DE | 3205439 A1 | 8/1983 |
| DE | 3633172 A1 | 4/1988 |
| DE | 19735281 A1 | 2/1999 |
| EP | 0200496 A2 | 11/1986 |
| EP | 0575797 A1 | 12/1993 |
| EP | 1715260 A | 10/2006 |
| JP | 2-122159 A | 5/1990 |
| JP | 2005327595 A | 11/2005 |
| JP | 2006083036 A | 3/2006 |
| KR | 20010104037 A | 11/2001 |
| WO | 94/28361 A1 | 12/1994 |
| WO | 00/49421 A1 | 8/2000 |
| WO | 00/49658 A1 | 8/2000 |
| WO | 02/097724 A1 | 12/2002 |
| WO | 2007/104028 A1 | 9/2007 |
| WO | 2007109901 A1 | 10/2007 |
| WO | WO2008005557 A2 | 1/2008 |

OTHER PUBLICATIONS

Bett et al. "Flatcon and Flashcon Concepts for High Concentration PV", Presented at the 19th European Photovoltaic Solar Energy Conf., Jun. 7-11, 2004, Paris, 4 pages.

Benitez et al. "High-Concentration Mirror-Based Kohler Integrating System for Tandem Solar Cells", WCPEC2006, 4 pages.

Terao, Akira "MicroDish: A Novel Reflective Optic for Flat-Plate Micro-Concentrator", SPIE's 49th Annual Meeting, Aug. 2-6, 2004, Denver, Colorado, USA, 9 pages.

Sun et al. "Modeling and Experimental Evaluation of Passive Heat Sinks for Miniature High-Flux Photovoltaic Concentrators", Transactions of the ASME, vol. 127, pp. 138-145 (2005).

Gordon et al. "Optical performance at the thermodynamic limit with tailored imaging designs", Applied Optics, in press, Dec. 2004, 16 pages.

Alvarez et al. "RXI Concentrator for 1000X Photovoltaic Energy Conversion", Proc. SPIE, vol. 3781, 30 (1999), 9 pages.

Swanson, Richard M. "The Promise of Concentrators", Prog. Photovolt. Res. Appl. 8, pp. 93-111 (2000).

Nguyen, Luu "Wafer Level Packaging for Analog/Mixed Signal Applications", MEPTEC Int. Wafer Level Packaging Conference, Aug. 22, 2002, 41 pages.

Gyenes, T. et al. "Electrically Adjustable Thermotropic Windows Based on Polymer Gels", Polymers for Advanced Technologies, No. 14, 2003, pp. 757-762.

Konorov, S. O. et al. "Three-dimensional reversible laser micromachining with subnanojoule femtosecond pulses based on two-photon photochromism", Applied Physics B, No. 76, 2003, pp. 707-710.

* cited by examiner

COLLAPSIBLE SOLAR-THERMAL CONCENTRATOR FOR RENEWABLE, SUSTAINABLE EXPEDITIONARY POWER GENERATOR SYSTEM

FIELD OF THE INVENTION

This invention relates to portable power generation systems and in particular to a collapsible solar-thermal concentrator for a renewable, sustainable expeditionary power (RSEP) generation system.

BACKGROUND OF THE INVENTION

Reducing the need for fuel in expeditionary settings has become an urgent need for the U.S military. Fuel resupply is extremely costly in remote locations, and so reducing fuel usage could provide substantial savings. Moreover, because fuel convoys are targets, reducing fuel needs saves the lives of soldiers and Marines.

There are a number of obstacles to effectively using solar energy in an expeditionary setting. The first is the sheer area of solar collector necessary to provide sufficient power to replace current solutions such as the 3 kW tactical quiet generator. The second is storage—a tactical power system simply must provide power when the sun is down. Batteries alone are not a satisfactory solution, as they are extremely heavy, costly, or both.

Stirling engines are external combustion devices and are insensitive to the source of heat. They are ideally suited for multi-fuel and or hybrid fuel/renewable energy applications. Stirling-dish systems are currently being commercialized for large-scale solar-thermal plants. JP-8 combustion has been demonstrated as a suitable heat source. Stirling engines are more efficient at converting sunlight to electricity than silicon photovoltaics and more efficient at converting liquid fuels (such as JP-8) than regular internal combustion engines.

What is needed is a tactical power generator for expeditionary settings that is lightweight, portable, and consumes a minimal amount of liquid fuel. In particular, what is needed is a solar-thermal concentrator that can supply sufficient concentrated solar energy to fully power a solar/fuel Stirling engine during daylight hours, can be transported in a light tactical trailer and quickly erected by two people without the use of ladders, and has a profile that minimizes wind loading and detection.

SUMMARY OF THE INVENTION

The present invention is directed to a solar-thermal concentrator for a renewable, sustainable expeditionary power (RSEP) generator system that addresses the challenges set forth above. The RSEP generator system utilizes a portable power plant including a hybridized solar/fuel Stirling engine to supply a predetermined amount of electric power in an expeditionary setting. The hybridized solar/fuel Stirling engine is an external combustion engine that converts heat energy to mechanical work, where the heat energy is supplied both by the concentrated solar energy from a solar-thermal concentrator, and by a burner that burns a suitable liquid fuel (e.g., JP-8). The mechanical work generated by the Stirling engine drives an electric generator that outputs a predetermined amount of electric energy (e.g., 3 kW). The portable power plant includes a controller that varies the burner's output in response to changes in available solar power (e.g., cloud transits or nighttime) in order to maintain a uniform power output by the generator at all times. By maximizing the heat energy supplied to the Stirling engine from available sunlight, the RSEP generator system significantly reduces the amount of fuel consumed by the burner.

The present invention is particularly directed to a lightweight collapsible solar-thermal concentrator having a substantially flat, semi-circular reflector panel assembly having a Fresnelized reflective surface that is tiltably and rotatably oriented by a tracking system according to the sun's movement such that the diametrical (straight) edge of semi-circular reflective surface remains close to the ground level in all operating positions. The portable power plant is maintained by a support structure in a focal region of the reflective surface. By forming the reflector panel assembly with a substantially flat semi-circular shape and controlling the reflective surface such that the diametrical edge remains close to the ground, the lightweight collapsible solar-thermal concentrator of the present invention minimizes windloading and produces a low profile that minimizes the chance of detection during operation, both important features in expeditionary settings.

According to an aspect of the present invention, the solar-thermal concentrator generally includes a collapsible base assembly and a collapsible dish assembly comprising component parts that are optimized for rapid assembly by two people without the need for a ladder. The base assembly components are assembled at ground level, and then the dish assembly is assembled over the base assembly. The dish assembly generally includes a multi-part semi-circular frame that is assembled in a laid-down (horizontal) position over the base assembly, the semi-circular reflector panel assembly, which is made up of multiple fan-shaped reflector panels that are individually connected to the frame while it is still in the laid-down position, and an elongated Stirling engine support structure that is fixedly connected to a central mounting structure of the frame after the frame is rotated into a upright (vertical) position relative to the base assembly. A lightweight tracking system, which is operably connected to the base assembly and frame, includes motors that lift the frame into the upright position for attachment of the support structure and, during subsequent normal operation, controls a tilt angle and rotational angle of the dish assembly relative to the base assembly such that the reflective surface operably follows the sun's azimuth and elevation position throughout the day. By optimizing the size and weight of the component parts forming both the base assembly and the dish assembly such that they are easily transported using a light tactical trailer and can be easily assembled using the method described above, the solar-thermal concentrator is optimized for rapid assembly by two people.

In accordance with a specific embodiment of the present invention, the base assembly includes a turntable that rotates around circular rail supported by five radial legs. The turntable has a horizontal upper surface that is maintained close to the ground in order to serve as a convenient platform for assembly of the dish assembly, and to facilitate rotation of the dish assembly relative to the circular rail during operation by way of a peripherally located low power azimuth tracking motor. In an alternative embodiment, an integral azimuth/elevation tracker mechanism is mounted in the center of a multi-legged base assembly, and the dish assembly is supported by the integral azimuth/elevation tracking mechanism. A benefit of this alternative arrangement is that both sun azimuth and sun elevation tracking motors can be placed in a single housing.

In accordance with an aspect of the invention, the frame includes multiple radial arms (e.g., truss members) that attach to and extend from the central mounting structure in a semi-circular pattern, and at least one curved (e.g., semi-circular) cross-member that connects to the plurality of radial arms such that the radial arms and cross member(s) form a rigid semi-circular support structure. In one embodiment each of the radial arms is a planar truss formed such that front-facing surfaces of the planar trusses collectively form a plane when properly connected to the central mounting structure, whereby the assembly personnel can easily ascertain (e.g., either visually or using straight rulers) that the radial arms are correctly assembled. The frame is connected to the base either by way of a hinge-like mechanism that maintains the frame's "flat" diametrical edge (which is formed by aligned lowermost radial arms of the frame) close to the base when the dish assembly is rotated around a horizontal axis to adjust for the sun's elevation angle (i.e., such that the central mounting structure remains at a substantially fixed distance from the base when the frame is moved between a horizontal (laid-down) position and a vertical (upright) position. The semi-circular shape and hinge-like attachment of the frame along its straight diametrical edge facilitates assembly in the laid-down position by two people without the use of a ladder.

According to another aspect of the present invention, reflector panel assembly includes a plurality of flat, fan-shaped reflector panels that are secured to the frame and disposed in a semi-circular pattern. The flat, fan-shaped reflector panels are secured to the arms and/or cross-members of the assembled frame such that the panels extend in a radial pattern relative to the central mounting structure, and are rigidly held in a flat semi-circular pattern. Each panel includes multiple flat reflective surfaces that are fixedly arranged in a Fresnelized reflector pattern that focus the incident sunlight into a focal region located in front of the central mounting structure. In one embodiment two or more sets of dissimilar panels are provided, one set being sized and shaped for mounting on the inner radius regions of the dish, and the other set being sized and shaped for mounting on the outer radius regions of the dish, whereby the size and weight of each of the panels can be optimized for manual assembly. In another embodiment the panels are produced using a low cost manufacturing process in which sheet metal is stamped to include multiple reflecting surfaces connected by complimentary (connecting) portions, and then a suitable reflective material (e.g., ReflecTech™ Mirror Film or a layered reflective material sheets separated by a removable adhesive) is disposed on the reflecting surfaces. The complimentary (connecting) portions are formed with optional vent openings that reduce overall weight and potentially diffuse disturbance from wind agitation. In one embodiment, pairs of panels are connected along their radial edges by hinges that allow the panels to fold toward each other to protect the reflective surfaces during assembly and transport. In another embodiment, each of the panels is mounted on a straight metal member that extends in the radial direction and connect to the cross-members of the frame, whereby the straight metal members add strength to the frame when the dish is fully assembled. In yet another embodiment the panels comprise a silverized plastic film on plexiglass or molded plastic that reduces both thickness and weight of the panels. The plastic film is previously embossed to have facets that reflect sunlight onto the power plant.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in collapsible solar-thermal concentrators. The following description is presented to enable one of ordinary skill in the art to make and use the invention as provided in the context of a particular application and its requirements. As used herein, directional terms such as "upper", "upwards", "lower", "downward", "front", "rear", are intended to provide relative positions for purposes of description, and are not intended to designate an absolute frame of reference. In addition, the phrases "integrally connected" and "integrally molded" is used herein to describe the connective relationship between two portions of a single molded or machined structure, and are distinguished from the terms "connected" or "coupled" (without the modifier "integrally"), which indicates two separate structures that are joined by way of, for example, adhesive, fastener, clip, or movable joint. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
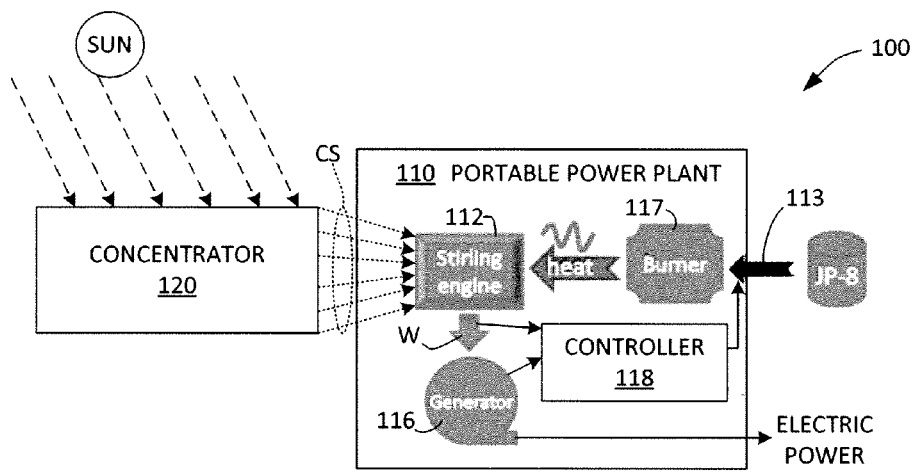
FIG. 1 is a simplified diagram showing a renewable, sustainable expeditionary power (RSEP) generator system according to a generalized embodiment of the present invention.

FIG. 1 is a simplified diagram showing a renewable, sustainable expeditionary power (RSEP) generator system 100 according to a generalized embodiment of the present invention. RSEP generator system 100 is characterized by having a portable power plant 110 including a hybridized solar/fuel Stirling engine 112 that supplies mechanical work W that drives an electric generator 116 in order to generate a predetermined amount of power (e.g., 3 kW) in expeditionary settings. A Stirling engine is an external combustion engine that converts heat energy to mechanical work. In one embodiment hybridized solar/fuel Stirling engine 112 is a 3 kWe free-piston Stirling engine that is optimized to utilize two heat sources: a burner 117 that generates heat by burning a liquid fuel (e.g., JP-8 fuel), and a solar-thermal concentrator 120 that supplies heat to Stirling engine 112 in the form of concentrated sunlight CS. Suitable hybridized solar-thermal Stirling engines are currently available from Sunpower, Inc. of Athens, Ohio, USA, or can be produced by those of ordinary skill in the art. The portable power plant 110 also includes a controller 118 that varies the heat output of burner 117 (i.e., the feed rate of fuel 113 into burner 117) in respond to changes in available solar power (e.g., cloud transits or nighttime) in order to maintain a uniform amount of electric power output from generator 116 at all times. As set forth above, by maximizing the heat energy supplied to Stirling engine 112 from available sunlight, RSEP generator system 100 significantly reduces the amount of combustible fuel 113 consumed by the burner 117, thus reducing the weight of fuel 113 that must be transported during an expedition. In the following description all components of portable power plant 110 (i.e., including Stirling engine 112, burner 117, generator 116 and controller 118) are depicted as contained within a cylindrical housing for convenience.

Figure 2:
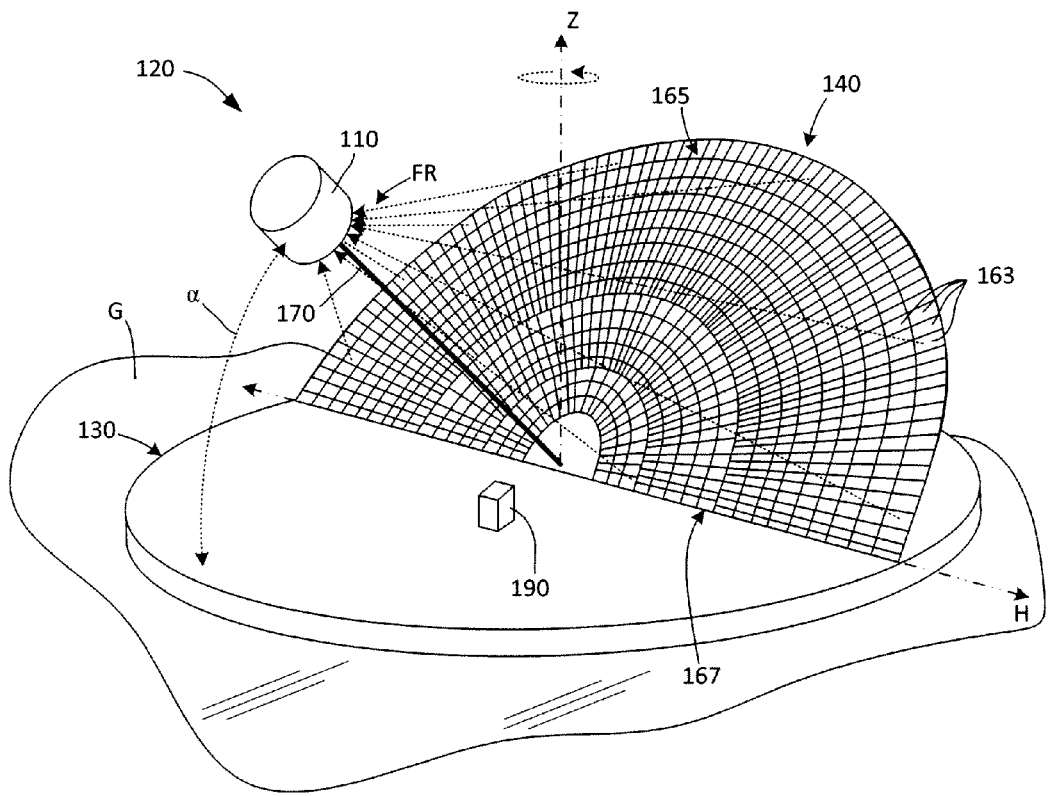
FIG. 2 is a simplified perspective view showing a solar-thermal concentrator utilized in the RSEP generator system of FIG. 1 according to an aspect of the present invention.

FIG. 2 is a simplified perspective view showing solar-thermal concentrator 120, which serves to provide substantially all necessary solar heat needed to power the Stirling engine of power plant 110 during optimal daylight hours, thus reducing or eliminating the need to burn liquid fuel during this time. Solar-thermal concentrator 120 generally includes a base assembly 130 and a semi-circular dish assembly 140 that includes multiple reflectors (mirrors) 163 that are arranged to form a substantially flat Fresnelized reflective surface 165, and supports portable power plant 110 by way of a support structure 170 such that portable power plant 110 is positioned in a focal region FR defined by reflective surface 165. Base assembly 130 and dish assembly 140 are operably connected and controlled by a tracking system 190 such that dish assembly 140 is pivotable around a vertical axis Z and tiltable around horizontal axis H relative to an underlying support surface (e.g., ground G). As set forth with reference to the specific embodiments described below, base assembly 130 and dish assembly 140 are made up of lightweight component parts that are sized for transport using a light tactical trailer, and designed for rapid assembly by two people without the need for a ladder. Because of the semi-circular shape of dish assembly 140, the assembled concentrator exhibits a relatively low operating profile to avoid detection and to minimize windloading, but is large enough to supply substantially all energy utilized by the Stirling engine in full (unimpeded) daylight, thus minimizing the amount of JP-8 fuel needed during tactical operations.

Figure 3:
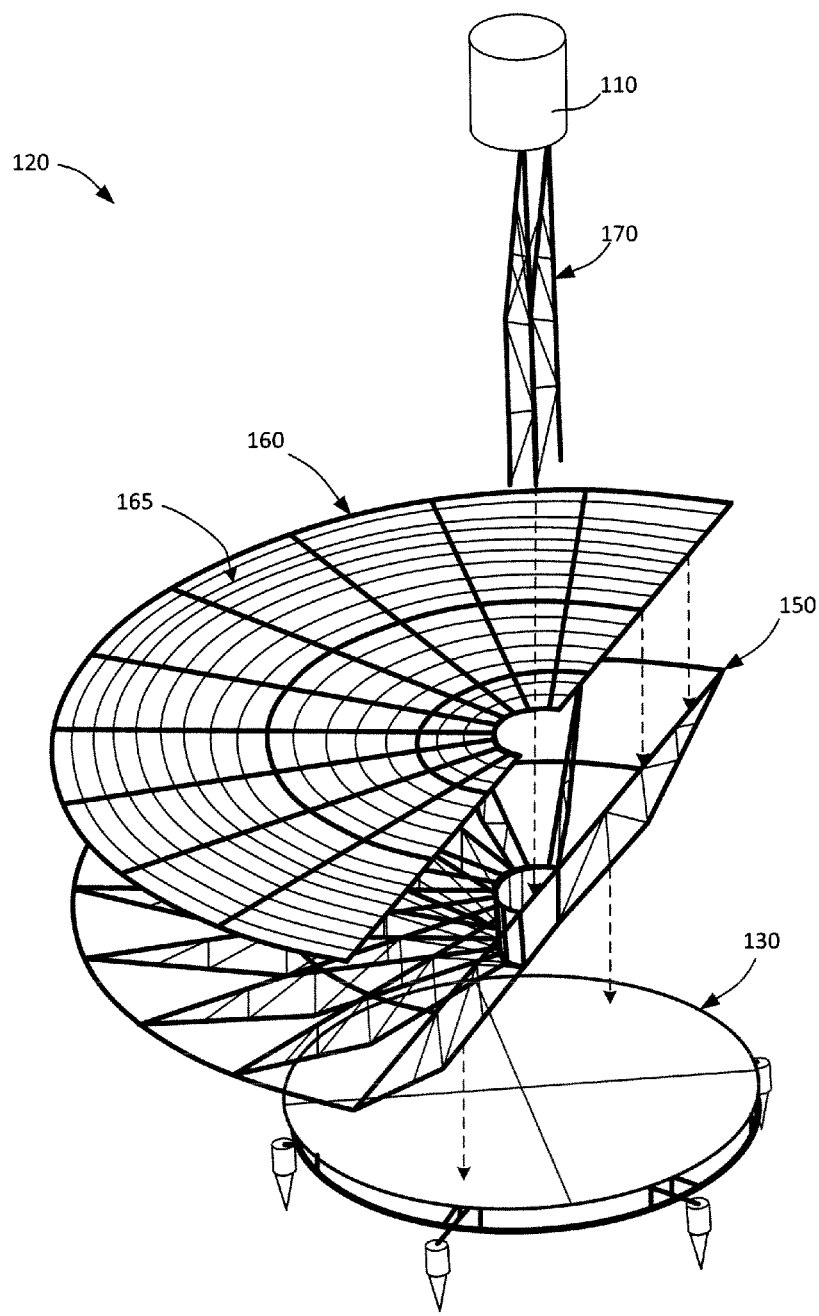
FIG. 3 is a partial exploded perspective view showing portions of the solar-thermal concentrator of FIG. 2 in additional detail.
Figure 4:
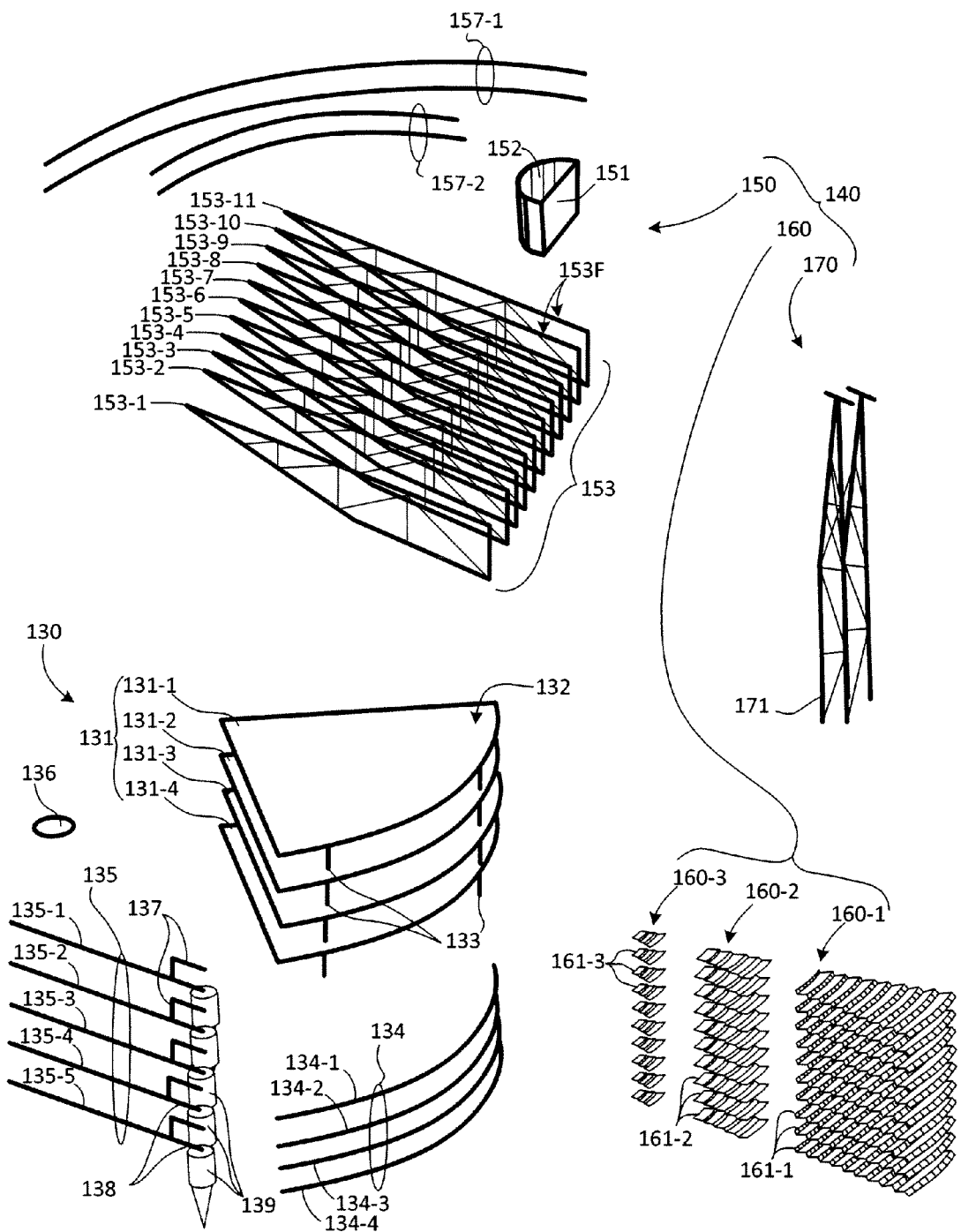
FIG. 4 is a partial exploded perspective view showing the portions of the solar-thermal concentrator of FIG. 3 in a disassembled state.

FIGS. 3 and 4 are exploded perspective view showing a portion of solar-thermal concentrator 120 according to an exemplary specific embodiment of the present invention, where solar-thermal concentrator 120 generally includes a collapsible base assembly 130 and a dish assembly 140 made up of a frame 150, a reflector panel assembly 160 and a Stirling engine support structure 170. FIG. 3 shows collapsible base assembly 130 and the various portions of a dish assembly 140 in a sub-assembled state, and illustrates a general assembly process utilized to assemble concentrator 120. FIG. 4 shows collapsible base assembly 130 and the various portions making up dish assembly 140 in an exemplary disassembled state, and FIGS. 5A-8 illustrate additional details regarding how the component parts of concentrator 120 are optimized for rapid assembly by two people.

Figures 5A, 5B, 5C:
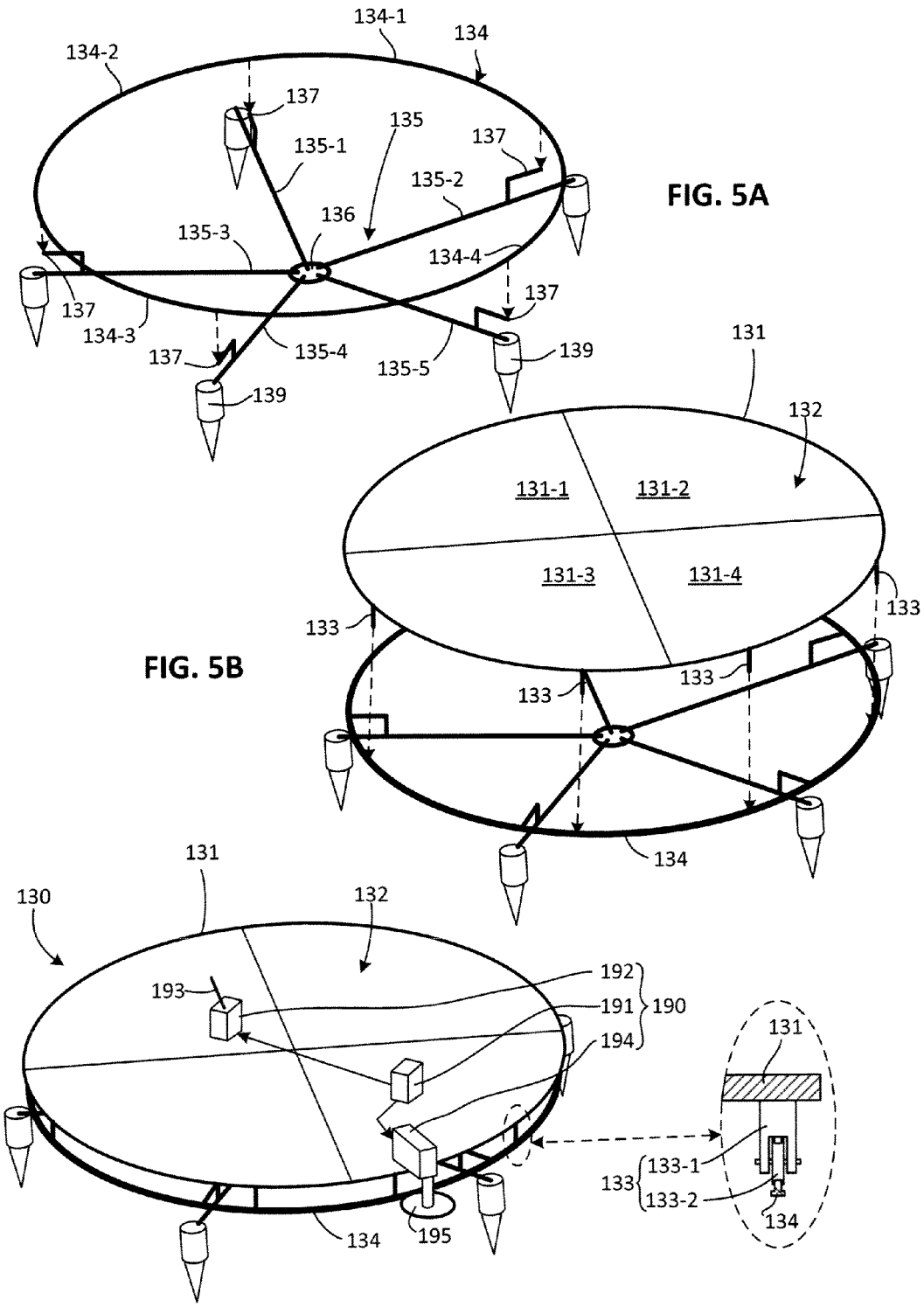
FIGS. 5A, 5B and 5C are perspective views depicting the assembly of a base assembly portion of the solar-thermal concentrator of FIG. 3.

Referring to FIG. 3, the general assembly process of solar-thermal concentrator 120 begins with the assembly of the component parts of base assembly 130 (shown in lower left portion of FIG. 4) at ground level, for example, using the methods described below with reference to FIGS. 5A-5C. Next, the component parts of multi-part semi-circular frame 150 (shown in upper left portion of FIG. 4) are assembled and mounted onto base assembly 130, for example, using the methods described below with reference to FIGS. 6A-6C. The component parts of reflective panel assembly 160 (shown in lower right portion of FIG. 4) are then assembled onto frame 150 while it is still in laid-down (horizontal) position, for example, using the methods described below with reference to FIGS. 8A-8C. Finally, elongated Stirling engine support structure 170 is connected to frame 150 using the methods described below with reference to FIGS. 9A and 9B.

Referring to the lower left portion of FIG. 4, according to the exemplary embodiment base assembly 130 generally includes a turntable 131, a circular rail 134 and a base frame 135 that are constructed from associated components parts. For example, turntable 131 comprises four quarter-circle component parts 131-1 to 131-4, each having a quarter-circular upper flat upper surface portion 132, and each having roller supports 133 extending downward from an associated outside edge portion. The four component parts are optimized for assembly to form turntable 131 as a rigid circular (disk-like) structure, as described below with reference to FIG. 5C. Similarly, circular rail 134 comprises four quarter-circular sections 134-1 to 134-4 include end connector structures that are optimized for connected to form a single circular rail structure as described below with reference to FIG. 5B. Base frame 135 is made up of five leg components 135-1 to 135-5 that are connected at inner portions to a disc-shaped connecting plate 136 as described below with reference to FIG. 5A. Outer portions of each leg component includes both a rail support arm 137 and a lower arm 138 connected to a short leg 139.

An exemplary assembly process for base assembly 130 will now be described with reference to FIGS. 5A-5C. Referring to FIG. 5A, construction of the base assembly begins with the formation of base frame 135 by connecting leg components 135-1 to 135-5 to disc-shaped connecting plate 136 with short legs 139 resting on or secured to the underlying support surface (e.g., the ground) by way of associated ground pins. The component parts (four quarter-circular sections 134-1 to 134-4) are then connected together, and circular rail 134 is then mounted onto rail support arms 137 as indicated by the vertical dashed arrows in FIG. 5A. Referring to FIG. 5B, quarter-disk component parts 131-1 to 131-4 are combined to form disk-like turntable 131, which is then mounted onto circular rail 134 by way of roller supports 133 as indicated by the vertical dashed arrows in FIG. 5B. FIG. 5C shows the completed base assembly 130, and the dash-lined bubble to the right of base assembly 130 illustrates details of an exemplary roller support 130, which includes a depending post 133-1 and a roller 133-2 that is constrained to travel along circular rail 134. FIG. 5C also shows a tracking system 190 that is operably connected to base assembly 130, and includes a sensor (or other controller) 191 that controls an elevation motor 192 and an azimuth motor 194 in accordance with the sun's current position such that incident sunlight is received at a substantially perpendicular angle in the manner described below with reference to FIG. 10, where elevation motor 192 utilizes a suitable linkage or other mechanism 193 that connects to the dish assembly (not shown) to control its tilt angle in accordance with the sun's current elevation, and azimuth motor 194 utilizes a suitable gear or other mechanism 195 that engages rail 134 to control the rotational position of dish assembly 140 in accordance with the sun's current azimuth angle. An advantage of base assembly 130 is that it provides a lower rotational moment (i.e., turntable surface 132 is close to the ground), and turntable 131 can be rotated using a low power motor azimuth motor 194 because it is positioned adjacent to the outer edge of turntable 131. Moreover, because turntable surface 132 is maintained close to the ground, it serves as a convenient platform for the construction of the dish assembly 140, as described below.

Referring to the upper left portion of FIG. 4, according to the exemplary embodiment frame 150 includes a half-cylinder shaped central mounting structure 151 having a front opening 152, and a radial arm array 153 and two semi-circular cross-members 157-1 and 157-2 that are constructed from associated components parts. Radial arm array 153 includes radial arms (e.g., truss members) 153-1 to 153-11 that connect to central mounting structure 151 in a spoke-like pattern, and semi-circular cross-members 157-1 and 157-2 comprise curved members that connect to radial arms 153-1 to 153-11 in the manner described below with reference to FIGS. 6A-6C. Each of radial arms 153-1 to 153-11 comprises a substantially identical planar truss structure including a straight front-facing surface 153F.

Figure 6A:
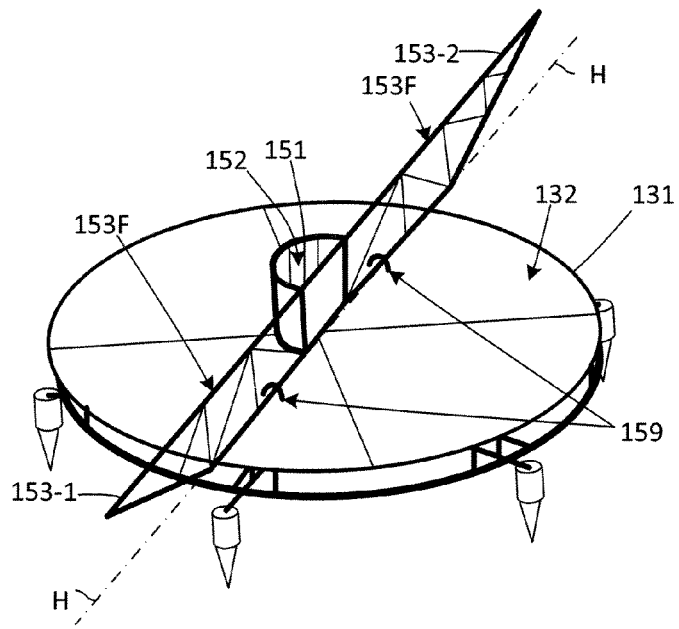
FIGS. 6A, 6B and 6C are perspective views depicting the assembly of a frame portion of the solar-thermal concentrator of FIG. 3.
Figure 6B:
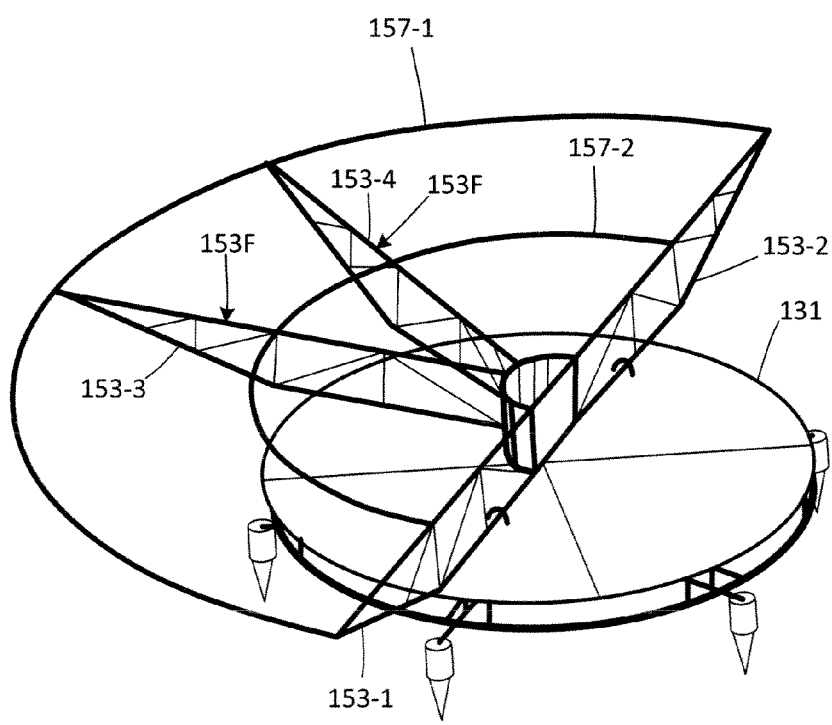
Figure 6C:
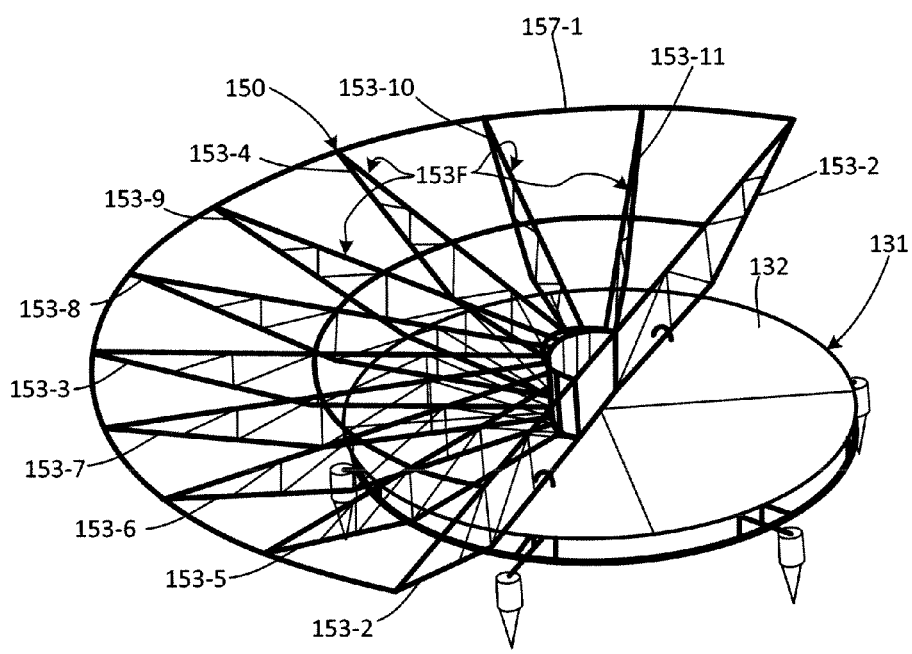

FIGS. 6A-6C are perspective views depicting a simplified process utilized to assemble frame 150 according to the exemplary specific embodiment. Tracking system 190 is omitted for clarity. As indicated in FIG. 6A, radial arms 153-1 and 153-2 are fixedly connected to opposite ends of central mounting structure 151 with front opening 152 and front edges 153F facing upward (away from turntable 131). Note that radial arms 153-1 and 153-2 form a straight front "diametrical" edge of the frame that pivots around horizontal axis H. In one embodiment radial arms 153-1 and 153-2 are connected to turntable 131 by way of hinge-like mechanisms 159, but the required hinged connection may be implemented by connection to central mounting structure 151 or by other connecting mechanism. As indicated in FIGS. 6B and 6C, remaining radial arms 153-3 to 153-11 and semi-circular cross-members 157-1 and 157-2 are added to the assembly in an arbitrary order. Note that each radial arm is fixedly connected to central mounting structure 151, and cross-members 157-1 and 157-2 are fixedly connect to each radial arms such that central mounting structure 151, radial arms 153-1 to 153-11 and cross members 157-1 and 157-2 form frame 150 as a rigid semi-circular structure. Proper connection of each additional radial arm (e.g., radial arms 153-3 and 153-4) is facilitated because the front edges 153F align to define an imaginary plane, which is easily observed (e.g., either visually or using straight rulers) by the assembling personnel. As indicated in FIG. 6C, radial arms 153-1 to 153-11 extend from the central mounting structure 151 in a semi-circular pattern and are rigidly connected to and held by cross-member cross-members 157-1 and 157-2 to form a semi-circular frame 150, which serves as a support structure for mounting reflector panel assembly 160, as described below. Another advantage of the exemplary arrangement is that frame 150 is assembled in easily managed pieces substantially at ground level using turntable 131 as an assembly surface, which facilitates construction without the use of a ladder.

Figure 8A:
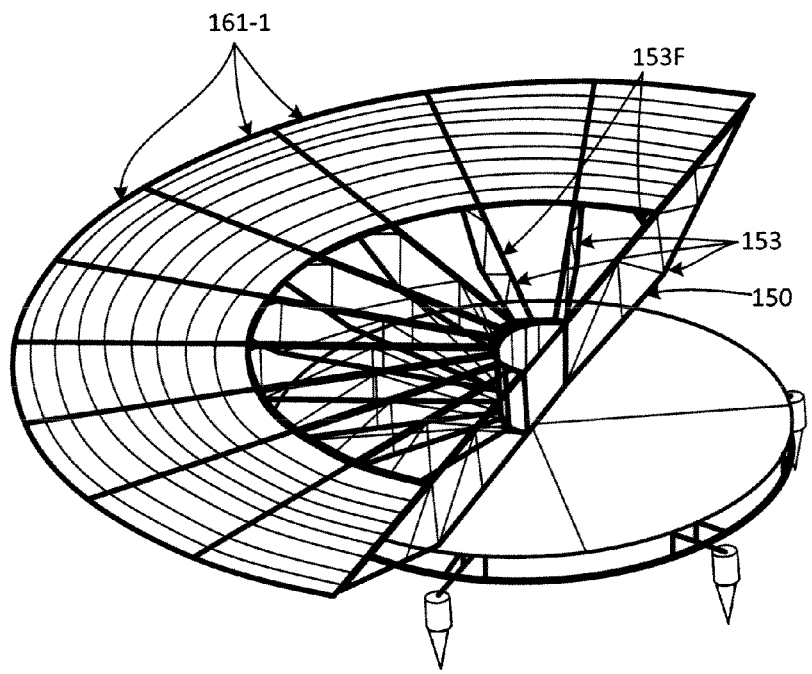
FIGS. 8A, 8B and 8C are perspective views depicting the assembly of a reflector panel portion of the solar-thermal concentrator of FIG. 3.
Figure 8B:
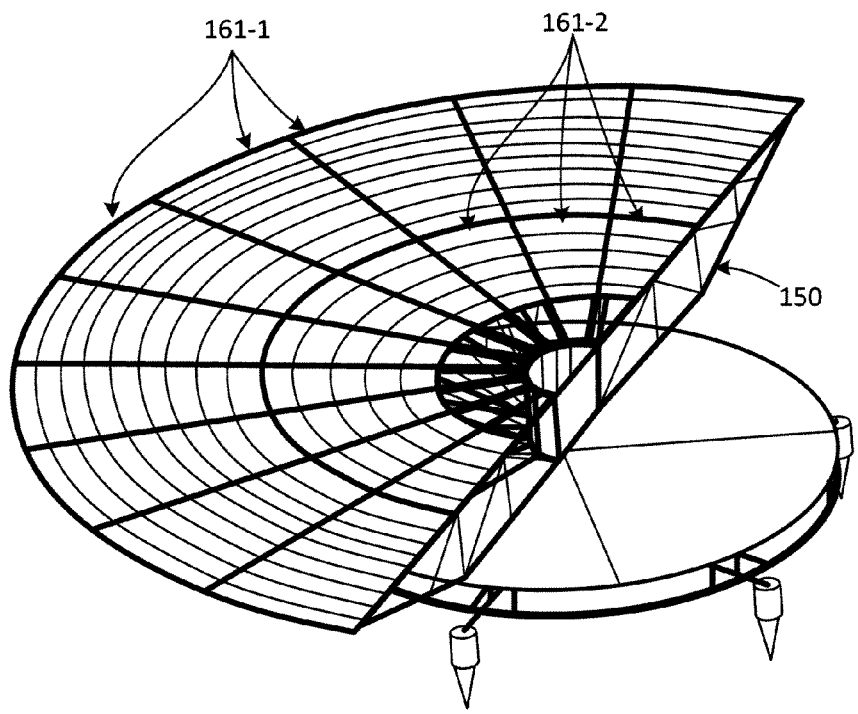
Figure 8C:
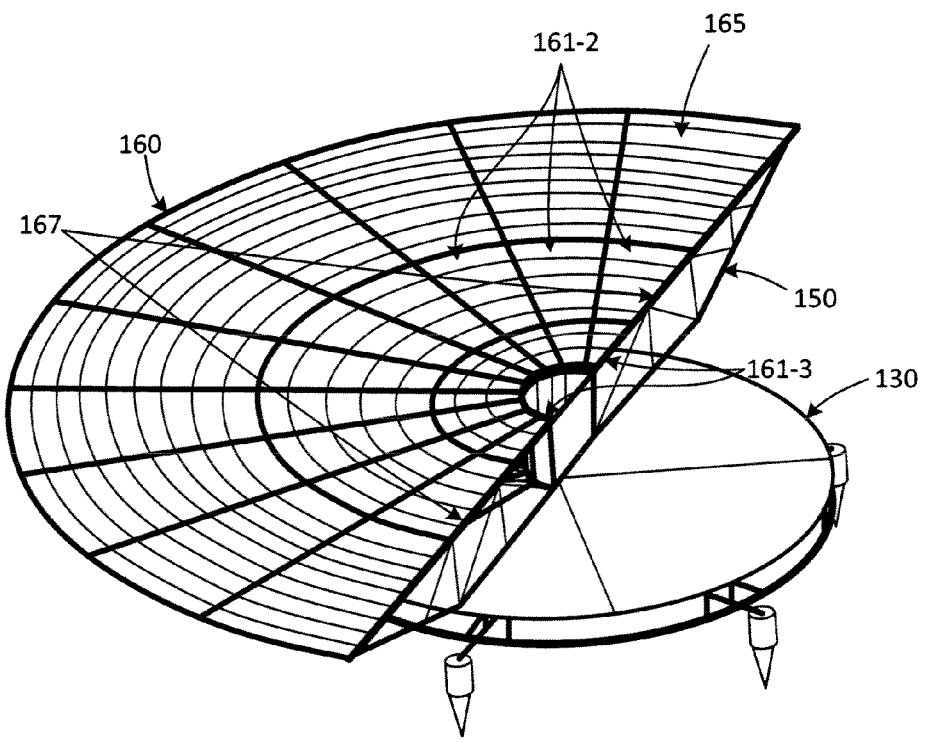

Referring to the lower right portion of FIG. 4, reflector panel assembly 160 includes flat, fan-shaped reflector panel sets 160-1, 160-2 and 160-3. According to the exemplary embodiment, fan-shaped reflector panel sets 160-1, 160-2 and 160-3 include panels 161-1, 161-2 and 161-3, respectively, that are dissimilar in size from panels of the other sets (i.e., the panels 161-1 are larger than the panels 161-2 and 161-3). Specifically, panels 161-1 of set 160-1 are sized and shaped for mounting on the outermost radius regions of frame 150 (i.e., as indicated in FIG. 8A), panels 161-2 of set 160-2 are sized and shaped for mounting in central radius regions of frame 150 (i.e., as indicated in FIG. 8B), and panels 161-3 of set 160-3 are sized and shaped for mounting on the innermost radius regions of frame 150 (i.e., as shown in FIG. 8C). The size and weight of each of the panels is optimized for manual assembly, so any number of panel sets may be used depending on the size of the dish assembly and the materials used to make the reflector panels.

Figure 7:
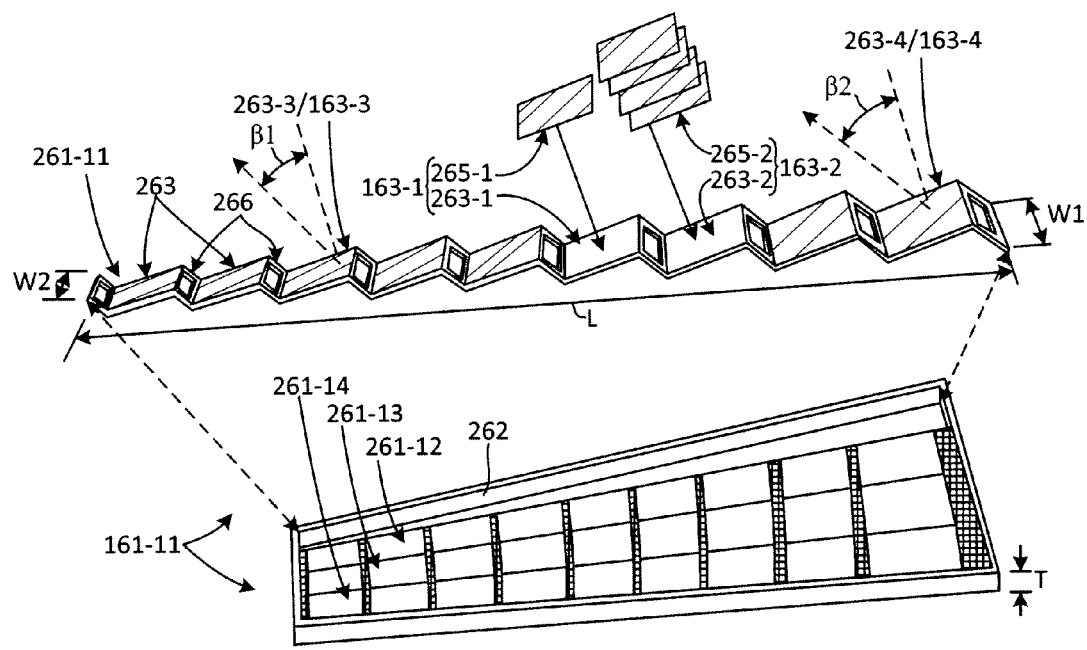
FIG. 7 is an exploded perspective view showing a reflector panel of the solar-thermal concentrator of FIG. 3 in additional detail.

FIG. 7 is an exploded perspective view showing the construction of a single panel 161-11, which is exemplary of all panels in each panel set 160-1, 160-2 and 160-3 (see FIG. 4). Panel 161-11 includes four identical Fresnel structures 261-11 to 261-14 that are secured inside a peripheral housing 262, where Fresnel structure 261-1 is removed from housing 262 and enlarged to illustrate the details of each Fresnel structure 261-11 to 261-14. In one embodiment, Fresnel structure 262-11 is produced using a low cost manufacturing process in which sheet metal is stamped to include multiple reflector facets 263 connected by complimentary (connecting) portions 266. A suitable reflective material (e.g., ReflecTech™ Mirror Film or a layered reflective material) is then disposed on each reflector facet to provide the individual reflectors making up the Fresnelized reflective surface 165. For example, reflector 163-1 is formed by a single layer 265-1 of reflective material that is permanently adhered to reflector facet 263-1. Alternatively, reflector 163-2 is formed by multiple sheets 265-2 of a polymer-film based reflective material that are placed as a stack (with removable adhesive between the layers) onto each reflector facet (e.g., reflector facet 263-2), whereby an excessively dust-fouled reflector can be "refreshed" by removing the uppermost reflective material sheet (i.e., the uppermost sheet is peeled and discarded), exposing the high-reflectivity surface of the layer below. The number of laminated sheets is determined, for example, by the length of the mission (e.g., 15 layers/sheets for a 15-day expedition so that the mirror could be renewed up to once a day if needed). Reflector facets 263 are fixedly arranged in a Fresnelized reflector pattern to focus incident sunlight into the focal region described above with reference to FIG. 2. That is, as indicated in FIG. 7, reflector facet 263-3 is set such that reflector 163-3 reflects incident sunlight at an angle $\beta 1$, and reflector facet 263-4 is set such that reflector 163-4 reflects incident sunlight at an angle $\beta 2$, where angles $\beta 1$ and $\beta 2$ are different and set such that sunlight reflected from each reflectors 163-3 and 163-4 (along with light reflected from the remaining reflectors of Fresnel structure 261-1) is directed to the predetermined focal region, whereby all of the reflected sunlight from each of these facets is directed onto the Stirling engine. In an exemplary embodiment, Fresnel structure 262-1 has a length L of approximately 1.5 meters, an outer width W1 of approximately 0.12 meters, and an inner width W2 that is made smaller than outer width W1 in accordance with the location of panel 161-11. In one embodiment, complimentary portions 266 are formed with optional vent openings that reduce overall weight and potentially diffuse disturbance from wind agitation. Because individual reflectors are tilted, this design requires that the thickness T of each panel 161-11 to be at least 6 cm. The size of each panel is chosen to allow a human to handle them.

FIGS. 8A-8C are perspective views depicting a process of mounting the reflector panels on fame 150 according to the exemplary specific embodiment. FIG. 8A shows panels 161-1 are mounted first onto front-facing surfaces 153F of radial arms 153 in the outer radial regions of frame 150, FIG. 8B shows panels 161-2 are then mounted inside panels 161-1 in central radial regions of frame 150, and FIG. 8C shows panels 161-3 are then mounted inside panels 161-2 in the innermost radial regions of frame 150. An advantage of forming the reflector panels in the manner described above with reference to FIG. 7 is that the process shown in FIGS. 8A-8C completes the formation of reflector panel assembly 160 in an accurate and intuitive manner in a minimal amount of time by one or two persons. Moreover, by assembling reflector panel assembly 160 such that reflective surface 165 is semi-circular and substantially-flat, the pre-formed reflective angles of each reflector (mirror) facet are automatically positioned and aligned to direct sunlight onto the Stirling engine during operation, thereby minimizing post-assembly adjustment. Note that end panels align to form a diametrical edge 167 of reflective surface 165 that remains close to turntable 130 during operation.

Figure 9A:
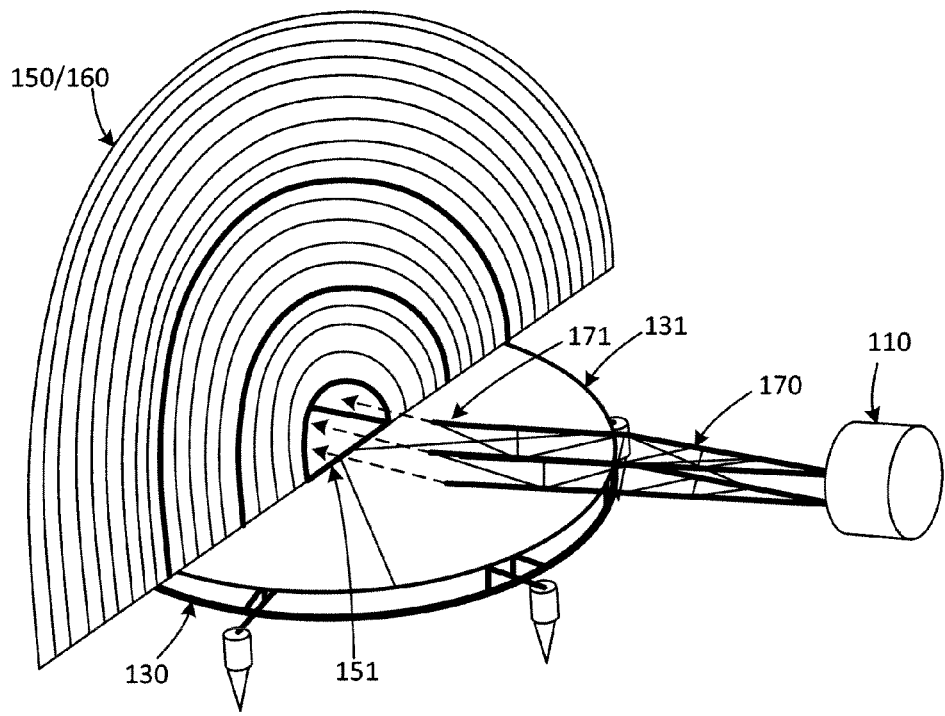
FIGS. 9A and 9B are perspective views depicting the attachment of a support structure portion of the solar-thermal concentrator of FIG. 3.
Figure 9B:
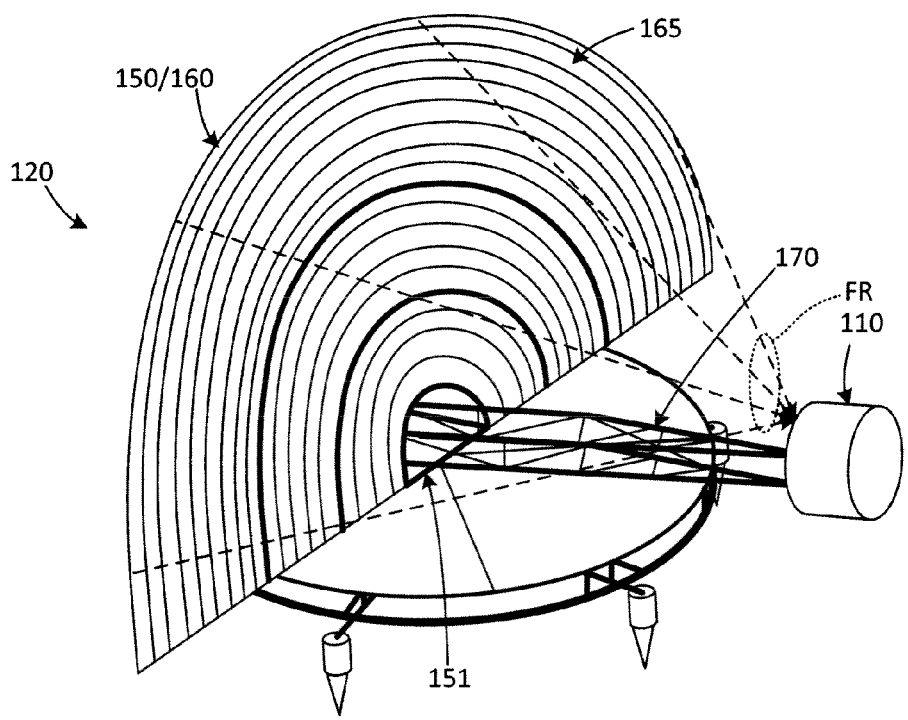

FIGS. 9A-9B are perspective views depicting a process utilized to connect support structure 170 onto frame 150 according to the exemplary specific embodiment. As set forth above, frame 150 is connected to table 131 such that central mounting structure 151 remains close to the base 130 when frame 150 and reflector panel assembly 160 are rotated from the horizontal (laid-down) position (e.g., as indicated in FIG. 8C) to the vertical (upright) position as shown in FIG. 9A. The process of raising frame 150 and reflector panel assembly 160 is accomplished, for example, utilizing the elevation tracking motor and associated linkage (not shown) that are connected to frame 150 as described above. With frame 150 and reflector panel assembly 160 in the vertical position, support structure 170 (with power plant 110 already attached) is moved horizontally using, for example, a scissor-type transmission jack on wheels (not shown) into the position shown in FIG. 9A, and then free end 171 is inserted into and secured to central mounting structure 151. Support 170 and power plant 110 are thus connected without the use of a ladder. Support structure 170 is formed such that the Stirling engine (located inside power plant 110) is automatically accurately maintained at a fixed distance from reflector panel assembly and positioned in the focal region defined by reflector surface 165.

Figure 10:
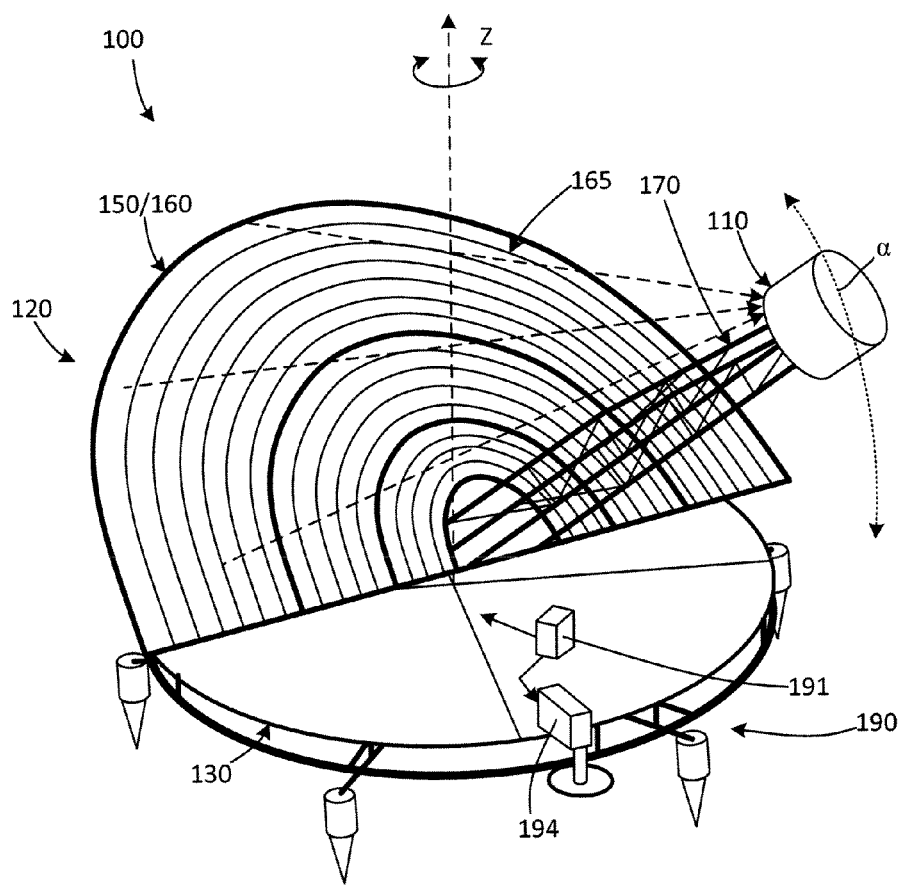
FIG. 10 is a perspective view showing the solar-thermal concentrator of FIG. 3 in a fully assembled state.

FIG. 10 is a perspective view showing RSEP generator system 100 after dish assembly 120 is completed and fully functional. During daylight hours tracking system 190 utilizes sensor/controller 191 to control the orientation of reflective surface 165 such that incident sunlight is received at a substantially perpendicular angle by way of the elevation motor (not shown) that sets tilt angle α relative to base assembly 130 according to the sun's current elevation, and by way of azimuth motor 194 that sets the rotational angle of dish assembly 140 around axis Z relative to the ground according to the sun's current azimuth position. By orienting dish assembly 140 such that incident sunlight is perpendicular to reflective surface 165, reflective surface 165 continuously focuses the incident sunlight onto power plant 110 throughout the daylight hours. For a given reflector area, whereas a vertical circular dish will stand to be as tall as its diameter of D=2r, the half-dish shape of dish assembly 120 only stands as tall as 1.414r. This lower height is advantageous in being undetected by enemies. For example, for a Stirling engine that outputs 3 KWe, the highest point on a half-dish is 3 meters from the turn-table, versus 4.24-meter for a full circular dish. Furthermore, semi-cylindrical dish assembly 140 pivots around a long and rigid horizontal hinge along turntable 131 to resist wind disturbance and modal oscillation.

Various modifications to the specific embodiment described above with reference to FIGS. 3-9 may be made that remain within the spirit and scope of the present invention.

Figure 11:
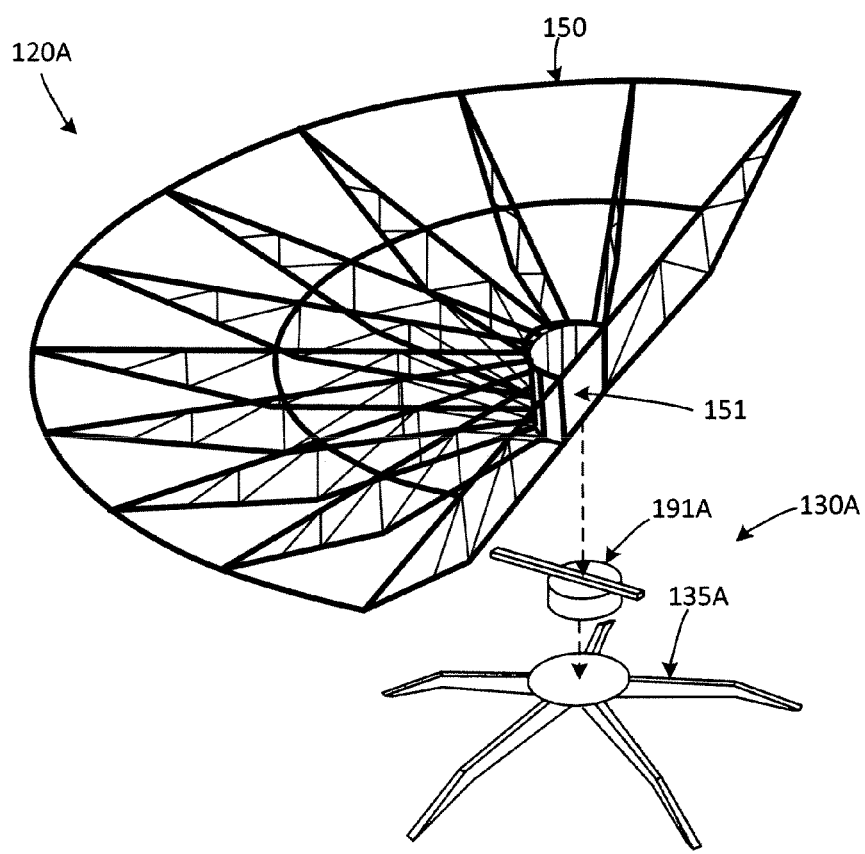
FIG. 11 is an exploded perspective view showing a partial solar-thermal concentrator according to an alternative embodiment of the present invention.

FIG. 11 is an exploded partial perspective view showing a solar-thermal concentrator 120A having a base assembly 130A in which an integral azimuth/elevation tracker mechanism 191A is mounted in the center of a multi-legged base 135A, where the dish assembly (indicated by frame 150) is tiltably and rotatably supported by integral azimuth/elevation tracking mechanism 191A. A benefit of this alternative arrangement is that both sun azimuth and sun elevation tracking motors can be placed in a single housing.

Figure 12A:
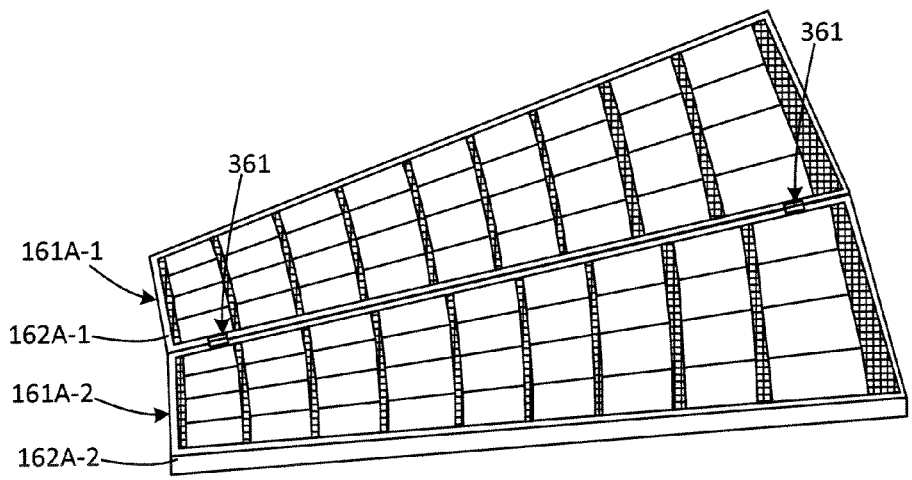
FIGS. 12A and 12B are perspective views depicting reflector panels according to an alternative embodiment of the present invention.
Figure 12B:
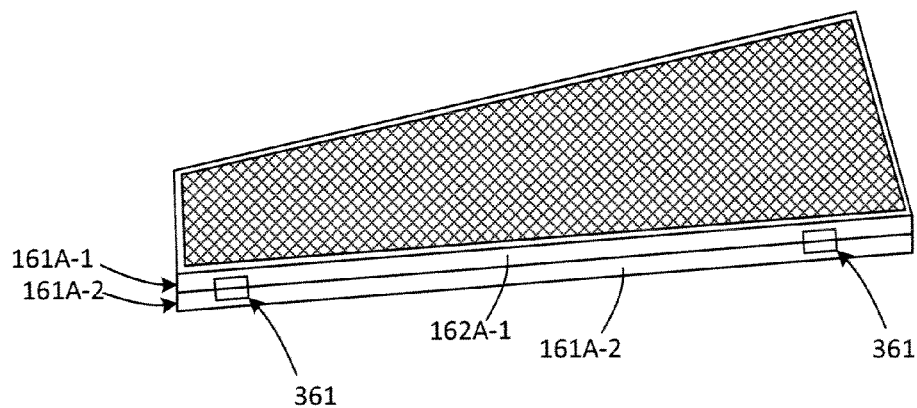

In another alternative embodiment shown in FIGS. 12A and 12B, pairs of panels 161A-1 and 161A-2 are connected along their radial edges by hinges 361 that allow the panels to fold toward each other to protect the reflective surfaces and to minimize storage space during assembly and transport. FIG. 12A shows panels 161A-1 and 161A-2 in the open (operating) condition, and FIG. 12B shows panels 161A-1 and 161A-2 in a folded condition in which a backside surface of each of panels 161A-1 and and 161A-2 is pointed outward.

Figure 13A:
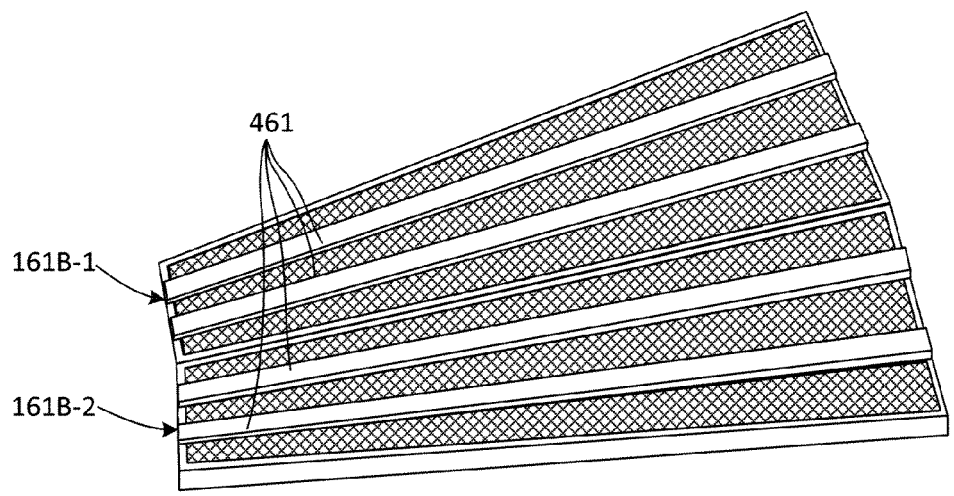
FIGS. 13A and 13B are perspective views depicting reflector panels according to another alternative embodiment of the present invention.
Figure 13B:
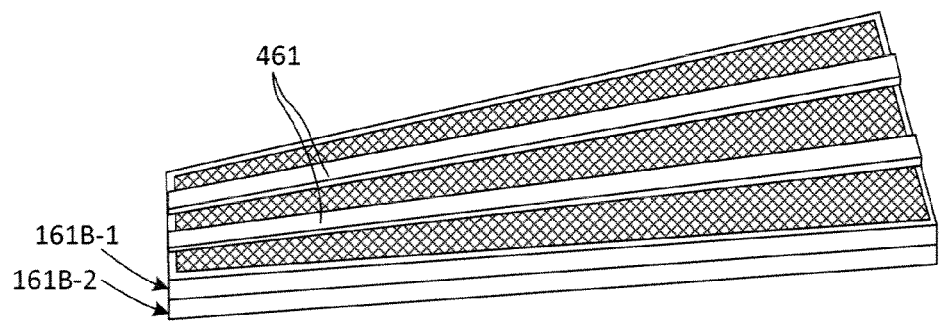

In another alternative embodiment shown in FIGS. 13A and 13B, each panel 161B-1 and 161B-2 includes at least one straight metal member 461 that extends in the radial direction. Straight metal members 461 are integral or fixedly connected, for example, to the box-like housing 262C surrounding each panel 161B-1 and 161B-2, and attach to the cross members or other structures to add strength to frame 150 without straining the reflectors when the reflector panel assembly is fully installed. Metal members 461 may also serve to ensure correct alignment of the reflectors with respect to the Stirling engine. When utilized in conjunction with the foldable pair arrangement described above, straight metal members 461 are disposed on the outside of each folded panel set (e.g., as indicated in FIG. 13B) to protect the panels during transportation and assembly/disassembly.

Figure 14:
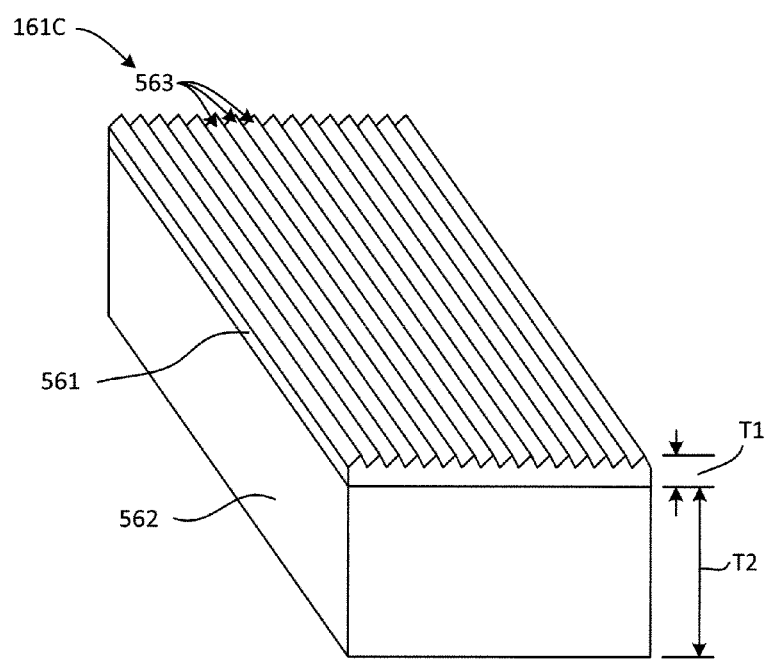
FIG. 14 is a simplified partial perspective view showing a thin molded plastic reflector panel utilized in accordance with yet another alternative embodiment of the present invention.

FIG. 14 is a simplified partial perspective view showing a thin molded plastic reflector panel 161C formed in accordance with another specific embodiment, where panel 161C includes a previously embossed and silverized plastic film 561 that is is mounted onto a lightweight substrate 562 (e.g., either a glass, molded plastic or a Plexiglass). An exemplary optical element/reflector structure similar to that shown in FIG. 14 by panel 161C is taught in co-owned and co-pending U.S. patent application Ser. No. 12/853,258, entitled "Stationary Sunlight Redirecting Element and System", which is incorporated herein by reference in its entirety, and the production methods taught in the co-owned application may be used to form micro-molded plastic film 561 such that it allows for an accurate formation of optical grade reflector facets 563 that are typically 100 to 150 microns in size and with sharp corners and coated with a reflective material, where reflector facets 563 are formed to incline at pre-computed angles to direct orthogonally incoming sunlight onto a target (e.g., the Stirling engine mounted as described above). In one specific embodiment, plastic film 563 has a thickness T1 of 0.15 mm, and substrate 462 is a flat Plexiglass substrate having a thickness T2 of 5 mm, whereby plastic film 166C forms the necessary Point-Focus reflective surface that is also flat. By using thin molded plastic reflector panel 161C in place of the frame-based embodiments set forth above, the reflector panel thickness can be reduced from approximately six cm to approximately one cm, with a concomitant reduction in weight. Pairs of thin molded plastic reflector panels 161C may be hinged to form foldable pairs as described above, and each panel can offset slightly in the vertical direction to form a long air gap if air ventilation is desired.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A collapsible solar-thermal concentrator for a renewable, sustainable expeditionary power (RSEP) generator system, the collapsible solar-thermal concentrator comprising:
   a base assembly; and
   a semi-circular dish assembly that is mounted on the base assembly such that the dish assembly is pivotably and tiltably movable relative to an underlying support surface, the dish assembly including:
      a frame comprising a central mounting structure and a plurality of radial arms that are rigidly connected to and extend radially from the central mounting structure in a semi-circular pattern, and at least one curved member connected to the plurality of radial arms, wherein front surfaces of the plurality of radial arms define a plane, and where the frame is movable between a horizontal position in which the frame is parallel to the underlying support surface, and a vertical position in which the frame is perpendicular to the underlying support surface;
      a reflector panel assembly including a plurality of flat, fan-shaped reflector panels secured to the frame and disposed in a semi-circular pattern, each of the reflector panels including a plurality of reflectors that collectively form a substantially flat Fresnelized reflective surface that redirects incident sunlight into a focal region, and
      a support structure having a fixed end connected to the central mounting structure of the frame, at least one elongated beam extending perpendicular to the plane defined by the frame, and a free end disposed adjacent to the focal region defined by the Fresnelized reflective surface.

2. The solar-thermal concentrator according to claim 1, wherein the base assembly comprises a turntable having a flat upper surface, wherein the turntable is movably supported to rotate around a circular rail, and wherein the frame is tiltably connected to the flat upper surface.

3. The solar-thermal concentrator according to claim 1, further comprising an integral azimuth/elevation tracker mechanism fixedly mounted on the base assembly, wherein the dish assembly is mounted on the integral azimuth/elevation tracker mechanism.

4. The solar-thermal concentrator according to claim 1, wherein the plurality of flat, fan-shaped reflector panels comprise a first set of panels that are disposed on an outer radius of the dish assembly, and a second set of panels that are located between the first set of panels and the central mounting structure.

5. The solar-thermal concentrator according to claim 1, wherein each of the reflector panels comprises one or more stamped metal structures, each stamped metal structure including multiple reflector surfaces separated by connecting portions, and wherein the plurality of reflectors comprises at least one reflective material sheet disposed on each of the multiple reflector surfaces.

6. The solar-thermal concentrator according to claim 5, wherein the plurality of reflectors comprises multiple laminated reflective material sheets disposed in a stack on each of the multiple reflector surfaces, and a removable adhesive disposed between each adjacent pair of said reflective material sheets.

7. The solar-thermal concentrator according to claim 5, wherein each of the connecting portions of each said one or more stamped metal structures defines a vent opening.

8. The solar-thermal concentrator according to claim 1, wherein each of the reflector panels is connected by a hinge mechanism to an associated reflector panel, whereby said each reflector panel and said associated reflector panel are foldable toward each other to protect the plurality of reflectors.

9. The solar-thermal concentrator according to claim 1, wherein each of the reflector panels comprises at least one straight metal member that extends in the radial direction.

10. The solar-thermal concentrator according to claim 1, wherein each of the reflector panels comprises a silverized plastic film disposed on one of a glass substrate, a molded plastic substrate, and a plexiglass substrate, wherein the silverized plastic film is embossed to include a plurality of facets arranged to reflect light toward the focal region.

11. A renewable, sustainable expeditionary power (RSEP) generator system comprising:
   a hybridized solar/fuel power plant; and
   a collapsible solar-thermal concentrator including:
      a base assembly; and
      a semi-circular dish assembly that is mounted on the base assembly such that the dish assembly is pivotably and tiltably movable relative to an underlying support surface, the dish assembly including:
         a frame comprising a central mounting structure and a plurality of radial arms that are rigidly connected to and extend radially from the central mounting structure in a semi-circular pattern, and at least one curved member connected to the plurality of radial arms, wherein front surfaces of the plurality of radial arms define a plane, and where the frame is movable between a horizontal position in which the frame is parallel to the underlying support surface, and a vertical position in which the frame is perpendicular to the underlying support surface;
         a reflector panel assembly including a plurality of flat, fan-shaped reflector panels secured to the frame and disposed in a semi-circular pattern, each of the reflector panels including a plurality of reflectors that collectively form a substantially flat Fresnelized reflective surface that redirects incident sunlight into a focal region, and
         a support structure including at least one elongated beam extending perpendicular to the plane defined by the frame, the at least one beam having a first end connected to the central mounting structure of the frame and a free end disposed away from the frame,
   wherein the hybridized solar/fuel power plant is mounted on the free end of the support structure such that the hybridized solar/fuel power plant is disposed in the focal region defined by the Fresnelized reflective surface.

12. The RSEP generator system according to claim 11, wherein each of the reflector panels comprises one or more stamped metal structures, each stamped metal structure including multiple reflector surfaces separated by connecting portions, and wherein the plurality of reflectors comprises at least one reflective material sheet disposed on each of the multiple reflector surfaces.

13. The RSEP generator system according to claim 12, wherein the plurality of reflectors comprises multiple laminated reflective material sheets disposed in a stack on each of the multiple reflector surfaces, and a removable adhesive disposed between each adjacent pair of said reflective material sheets.

* * * * *